United States Patent
Lee et al.

(10) Patent No.: US 9,954,210 B2
(45) Date of Patent: Apr. 24, 2018

(54) METHOD FOR MANUFACTURING SEPARATOR, SEPARATOR MANUFACTURED BY THE METHOD AND METHOD FOR MANUFACTURING ELECTROCHEMICAL DEVICE INCLUDING THE SEPARATOR

(75) Inventors: Joo Sung Lee, Daejeon (KR); Jang-Hyuk Hong, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 0 days.

(21) Appl. No.: 13/328,607

(22) Filed: Dec. 16, 2011

(65) Prior Publication Data
US 2013/0101885 A1  Apr. 25, 2013

Related U.S. Application Data

(63) Continuation of application No. PCT/KR2011/007859, filed on Oct. 20, 2011.

(51) Int. Cl.
*H01M 2/16* (2006.01)
*B05D 1/36* (2006.01)
(Continued)

(52) U.S. Cl.
CPC ........... *H01M 2/145* (2013.01); *H01M 2/166* (2013.01); *H01M 2/1646* (2013.01);
(Continued)

(58) Field of Classification Search
CPC .... H01M 2/145; H01M 2/166; H01M 2/1646; H01M 2/1653; H01M 2/1686;
(Continued)

(56) References Cited

U.S. PATENT DOCUMENTS 6,432,586 B1  8/2002  Zhengming
6,524,736 B1  2/2003  Bhaskar
(Continued)

FOREIGN PATENT DOCUMENTS

| CN | 1325145 A | 12/2001 |
| EP | 1 184 917 A2 | 3/2002 |

(Continued)

OTHER PUBLICATIONS

"Composition" as defined by Merriam-Webster's Online Dictionary, http://www.merriam-webster.com/dictionary/composition, Accessed May 2, 2014.*

*Primary Examiner* — Ula C Ruddock
*Assistant Examiner* — Amanda Barrow
(74) *Attorney, Agent, or Firm* — Lerner, David, Littenberg, Krumholz & Mentlik, LLP

(57) ABSTRACT

A method for manufacturing a separator includes (S1) preparing a porous substrate having pores, (S2) coating at least one surface of the porous substrate with a first solvent, (S3) coating the first solvent with a slurry containing inorganic particles dispersed therein and formed by dissolving a binder polymer in a second solvent, (S4) drying the first and second solvents simultaneously to form a porous organic-inorganic composite layer on the porous substrate. Since the phenomenon that the pores of the porous substrate are closing by the binder polymer is minimized, it is possible to prevent the resistance of the separator from increasing due to the formation of the porous organic-inorganic composite layer.

9 Claims, 1 Drawing Sheet

(51) Int. Cl.
  *B05D 3/02* (2006.01)
  *H01M 2/14* (2006.01)
  *H01M 10/0525* (2010.01)
  *B05D 3/10* (2006.01)
  *B05D 1/26* (2006.01)

(52) U.S. Cl.
  CPC ....... *H01M 2/1653* (2013.01); *H01M 2/1686* (2013.01); *H01M 10/0525* (2013.01); *B05D 1/26* (2013.01); *B05D 3/0254* (2013.01); *B05D 3/104* (2013.01); *B05D 2252/02* (2013.01)

(58) Field of Classification Search
  CPC ..... H01M 10/0525; B05D 3/104; B05D 1/26; B05D 3/0254; B05D 2252/02
  See application file for complete search history.

(56) References Cited

U.S. PATENT DOCUMENTS

| | | | |
|---|---|---|---|
| 2006/0046149 A1* | 3/2006 | Yong et al. | 429/251 |
| 2007/0099072 A1 | 5/2007 | Hennige et al. | |
| 2007/0122716 A1* | 5/2007 | Seo et al. | 429/251 |
| 2008/0311479 A1 | 12/2008 | Lee et al. | |
| 2009/0246613 A1* | 10/2009 | Park et al. | 429/145 |
| 2009/0305141 A1 | 12/2009 | Lee et al. | |
| 2010/0203387 A1* | 8/2010 | Yamamoto et al. | 429/220 |
| 2010/0261065 A1* | 10/2010 | Babinec | H01M 2/166 429/246 |
| 2010/0285341 A1 | 11/2010 | Yun et al. | |
| 2011/0064988 A1* | 3/2011 | Yu | 429/144 |
| 2011/0123850 A1* | 5/2011 | Duong et al. | 429/145 |
| 2011/0259505 A1 | 10/2011 | Lee et al. | |
| 2012/0090758 A1 | 4/2012 | Lee et al. | |

FOREIGN PATENT DOCUMENTS

| | | | | |
|---|---|---|---|---|
| JP | 2001-023602 | * | 2/2001 | ............. H01M 2/16 |
| JP | 2001/148243 A | | 5/2001 | |
| JP | 2009/518808 A | | 5/2009 | |
| JP | 2009/529762 A | | 8/2009 | |
| KR | 10-2007-0019958 A | | 2/2007 | |
| KR | 10-2008-0109237 | * | 12/2008 | ............. H01M 2/14 |
| KR | 2011/0035847 A | | 4/2011 | |
| WO | WO 2009/048263 A1 | | 4/2009 | |
| WO | WO 2011/105865 A2 | | 9/2011 | |
| WO | WO 2012/021044 | * | 2/2012 | ............. B01D 71/00 |

* cited by examiner

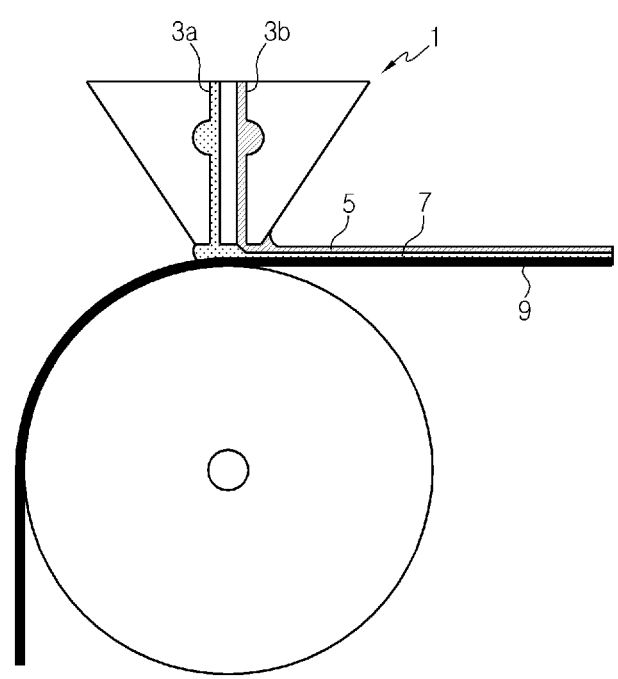

METHOD FOR MANUFACTURING SEPARATOR, SEPARATOR MANUFACTURED BY THE METHOD AND METHOD FOR MANUFACTURING ELECTROCHEMICAL DEVICE INCLUDING THE SEPARATOR

CROSS-REFERENCE TO RELATED APPLICATION

This application is a continuation of International Application No. PCT/KR2011/007859 filed on Oct. 20, 2011, the entire contents of which are incorporated herein by reference.

TECHNICAL FIELD

The present invention relates to a method for manufacturing a separator for an electrochemical device such as a lithium secondary battery, a separator manufactured by the method, and an electrochemical device including the separator. More specifically, the present invention relates to a method for manufacturing a separator in which an organic-inorganic composite porous layer composed of a mixture of inorganic particles and binder polymers is formed on at least one surface of a porous substrate, a separator manufactured by the method, and an electrochemical device including the separator.

BACKGROUND ART

Recently, there has been increasing interest in energy storage technologies. As the application fields of energy storage technologies have been extended to mobile phones, camcorders, notebook computers and even electric cars, efforts have increasingly been made towards the research and development of electrochemical devices. Under these circumstances, secondary batteries capable of repeatedly charging and discharging, in particular, have attracted considerable attention as the most promising electrochemical devices. In recent years, extensive research and development has been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni-MH batteries, Ni—Cd batteries, and $H_2SO_4$—Pb batteries. However, such lithium ion batteries suffer from safety problems, such as fire or explosion, when encountered with the use of organic electrolytes and have a disadvantage in that they are complicated to manufacture. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause short circuits between a cathode and an anode.

In order to solve the above safety problems of electrochemical devices, a separator has been suggested in which a mixture of inorganic particles and a binder polymer is coated on at least one surface of a highly porous substrate to form a porous organic-inorganic composite coating layer. For example, Korean Unexamined Patent Publication No. 2007-0019958 discloses a method for manufacturing a separator, in which a porous substrate such as a polyolefin film is coated with a slurry containing inorganic particles dispersed therein and formed by dissolving a binder polymer in a solvent and then dried to provide a porous organic-inorganic composite coating layer on the porous substrate.

The inorganic particles present in the porous coating layer serve as spacers that help to maintain a physical shape of the porous coating layer to inhibit the porous substrate from thermal shrinkage when an electrochemical device overheats or to prevent short circuits between both electrodes of the electrochemical device when thermal runaway takes place. Vacant spaces present between the inorganic particles form fine pores.

As described above, the organic-inorganic composite porous coating layer contributes to thermal stability of the separator, but tends to increase the resistance of the separator since the binder polymer flows into the pores of the porous substrate and closes a part of the pores when the organic-inorganic composite porous coating layer is formed.

DISCLOSURE

Technical Problem

The present invention is designed to solve the problems of the prior art, and therefore it is an object of the present invention to provide a method for manufacturing a separator, which may minimize the phenomenon that pores of a porous substrate are closed by a binder polymer when an organic-inorganic composite porous coating layer is formed. It is another object of the invention to provide a separator manufactured by the method. It is still another object of the invention to provide an electrochemical device including the separator.

Technical Solution

According to an aspect of the present invention, there is provided a method for manufacturing a separator, which includes (S1) preparing a porous substrate having pores; (S2) coating at least one surface of the porous substrate with a first solvent; (S3) coating the first solvent with a slurry containing inorganic particles dispersed therein and formed by dissolving a binder polymer in a second solvent; and (S4) drying the first and second solvents simultaneously to form a porous organic-inorganic composite layer on the porous substrate.

In the method for manufacturing a separator, the binder polymer of the porous organic-inorganic composite layer is preferably present on the surfaces of the inorganic particles in whole or in part as a coating layer, the inorganic particles preferably fixedly connect to each other by the coating layer in a closely adhered state, and the pores are preferably formed by vacant spaces present among the inorganic particles.

In the method for manufacturing a separator, the porous substrate is preferably a polyolefin-based porous film, and the porous substrate preferably has a thickness of 1 to 100 μm.

In the method for manufacturing a separator, the binder polymer preferably has a solubility parameter of 15 to 45 $MPa^{1/2}$. The binder polymer may be selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, or their mixtures.

In the method for manufacturing a separator, the first and second solvents may be independently selected from the group consisting of acetone, tetrahydrofuran, methylene chloride, chloroform, dimethylformamide, N-methyl-2-pyrrolidone (NMP), cyclohexane, water, or their mixtures.

In the method for manufacturing a separator, the difference in solubility parameters between the binder polymer and the first solvent, between the binder polymer and the second solvent, and between the first solvent and the second solvent is preferably 5.0 $Mpa^{0.5}$ or less, respectively, in consideration of the easiness of coating and the prevention of gelation of the binder polymer. In this aspect, it is more preferred that the first and second solvents employ the same kind of solvent.

In the method for manufacturing a separator, the average particle diameter of the inorganic particles is preferably 0.001 to 10 μm, and the weight ratio of the inorganic particles to the binder polymers is preferably 50:50 to 99:1.

In the method for manufacturing a separator, the first solvent preferably has a coating thickness of 10 to 250 μm, and the coating thickness of the slurry is preferably adjusted so that a finally produced porous organic-inorganic composite layer has a thickness of 0.1 to 20 μm.

The separator of the present invention manufactured by the above method may be interposed between a cathode and an anode to manufacture an electrochemical device such as lithium secondary batteries and supercapacitor devices.

Advantageous Effects

The separator manufactured by the method of the present invention exhibits the following advantageous effects.

First, the porous organic-inorganic composite layer restrains thermal shrinkage of a porous substrate when an electrochemical device overheats, and also prevents a short circuit between both electrodes when thermal runaway takes place.

Second, since the problem of the binder polymer in the slurry flowing into the pores of the porous substrate when the organic-inorganic composite porous coating layer is formed has been solved, it is possible to minimize the phenomenon of the pores of the porous substrate closing. Accordingly, the resistance increase of the separator caused by the formation of the porous organic-inorganic composite layer decreases.

DESCRIPTION OF DRAWINGS

FIG. 1 is a view schematically illustrating the process of a method for manufacturing a separator according to an embodiment of the present invention.

BEST MODE

Hereinafter, preferred embodiments of the present invention will be described in detail with reference to the accompanying drawing. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

The present invention provides a method for manufacturing a separator. The method of the present invention will now be described in detail.

First, a porous substrate having pores is prepared (S1).

The porous substrate may be any porous substrate commonly used in electrochemical devices. Examples of such porous substrates include various porous polymer membranes and non-woven fabrics. As the porous polymer membranes, for example, porous polyolefin membranes used in separators for electrochemical devices, particularly, lithium secondary batteries may be used. The non-woven fabrics may be, for example, those composed of polyethylene phthalate fibers. The material or shape of the porous substrate may vary according to intended purposes. Examples of materials suitable for the porous polyolefin membranes include polyethylene polymers, such as high density polyethylene, linear low density polyethylene, low density polyethylene and ultrahigh molecular weight polyethylene, polypropylene, polybutylene and polypentene. These polyolefins may be used alone or as a mixture thereof. Examples of materials suitable for the non-woven fabrics include polyolefins and polymers having higher heat resistance than polyolefins. The thickness of the porous substrate is preferably from 1 to 100 μm, more preferably from 5 to 50 μm, but is not particularly limited to this range. The pore size and porosity of the porous substrate are preferably from 0.001 to 50 μm and 10 to 95%, respectively, but are not particularly limited to these ranges.

Subsequently, at least one surface of the porous substrate is coated with a first solvent (S2).

In the present invention, the first solvent means a solvent which may dissolve a binder polymer, described later. The solvent capable of dissolving the binder polymer (namely, the first solvent) preferably has a solubility parameter similar to that of the binder polymer to be used and has a boiling point equal to or higher than that of a second solvent. It is because the second solvent is desirably dried together with or faster than the first solvent during a drying process, described later.

Non-limiting examples available as the first solvent include acetone, tetrahydrofuran, methylene chloride, chloroform, dimethylformamide, N-methyl-2-pyrrolidone (NMP), cyclohexane, water, or their mixtures.

The first solvent preferably has a coating thickness of 10 to 250 μm in consideration of the effect caused by the coating of the first solvent and the effectiveness according to a drying rate.

After that, the formed first solvent is coated with a slurry containing inorganic particles dispersed therein and formed by dissolving a binder polymer in the second solvent (S3).

The inorganic particles are not specifically limited so long as they are electrochemically stable. In other words, the inorganic particles can be used without particular limitation in the present invention if they do not undergo oxidation and/or reduction in an operating voltage range applied to an electrochemical device (for example, 0-5 V for Li/Li$^+$). In particular, a high dielectric constant of the inorganic particles can contribute to an increase in the degree of dissociation of a salt (e.g., a lithium salt) in a liquid electrolyte to improve the ionic conductivity of the electrolyte.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, here $0<x<1$ and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC particles. These inorganic particles may be used alone or as a mixture of two or more kinds thereof.

The inorganic particles may be those having the ability to transport lithium ions, that is, those containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_xTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$-$9Al_2O_3$-$38TiO_2$-$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture of two or more kinds thereof.

There is no particular restriction on the average particle diameter of the inorganic particles. The average particle diameter of the inorganic particles is preferably limited to the range of 0.001 to 10 μm. Within this range, a uniform thickness and an optimal porosity of the coating layer can be obtained. An average particle diameter of less than 0.001 μm may cause deterioration of dispersibility. Meanwhile, an average particle diameter exceeding 10 μm may increase the thickness of the coating layer.

The binder polymer preferably employs a polymer having a glass transition temperature, $T_g$) of −200 to 200° C., since such a polymer may improve mechanical properties such as flexibility and elasticity of a finally produced coating layer.

In addition, the binder polymer does not have to possess ion conductivity, but the performance of an electrochemical device may be further improved if a polymer having ion conductivity is used. Therefore, it is preferable for the binder polymer to have the highest dielectric constant possible. In fact, since the degree of dissociation of a salt depends on the dielectric constant of an electrolyte solvent, the higher the dielectric constant of the binder polymer, the more the degree of dissociation of a salt may be enhanced in the electrolyte. The dielectric constant of the binder polymer is available in the range of 1.0 to 100 (a measurement frequency=1 kHz), particularly preferably 10 or above.

In addition to the above functions, the binder polymer may have a high degree of electrolyte swelling as it is gelled when swelling in a liquid electrolyte. Accordingly, the binder polymer preferably has a solubility parameter of 15 to 45 MPa$^{1/2}$, more preferably 15 to 25 MPa$^{1/2}$ and 30 to 45 MPa$^{1/2}$. Therefore, hydrophilic polymers having many polarity groups are preferred to hydrophobic polymers such as polyolefin-based materials. If the solubility parameter is lower than 15 MPa$^{1/2}$ or greater than 45 MPa$^{1/2}$, the binder polymer may not easily swell by a common liquid electrolyte for a battery.

Non-limiting examples of the binder polymer includes polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, or their mixtures.

The weight ratio of the inorganic particles to the binder polymers is preferably in the range of 50:50 to 99:1 and more preferably 70:30 to 95:5. If the weight ratio of the inorganic particles to the binder polymers is less than 50:50, the pore size and porosity of the coating layer may be reduced since the content of the binder polymer increases. Meanwhile, if the inorganic particles are present in an amount exceeding 99 parts by weight, the peeling resistance of the formed coating layer may deteriorate since the content of the binder polymer is small.

In the present invention, the second solvent means a solvent capable of dissolving the binder polymer. The solvent of the binder polymer (namely, the second solvent) preferably has a solubility parameter similar to that of the binder polymer to be used and a boiling point lower than that of the binder polymer. It is for uniform mixing and easy removal of the solvent afterward. Non-limiting examples available as the second solvent includes acetone, tetrahydrofuran, methylene chloride, chloroform, dimethylformamide, N-methyl-2-pyrrolidone (NMP), cyclohexane, water, or their mixtures. The second solvent may be different from the first solvent.

In the method for manufacturing a separator according to the present invention, the difference in solubility parameters between the binder polymer and the first solvent, between the binder polymer and the second solvent, and between the first solvent and the second solvent is preferably 5.0 Mpa$^{1/2}$ or less, respectively, in consideration of the easiness of coating and the prevention of gelation of the binder polymer. In this aspect, it is more preferred that the first and second solvents employ the same kind of solvent.

The slurry containing inorganic particles dispersed therein and formed by dissolving the binder polymer in the second solvent may be produced by dissolving the binder polymer in the second solvent and then adding and dispersing inorganic particles, without being limited thereto. The inorganic particles may be added after being crushed to a suitable size, but it is preferred to add inorganic particles to the binder polymer solution and then perform ball milling or the like so that the inorganic particles are crushed and dispersed simultaneously.

The coating thickness of the slurry applied to the porous substrate is preferably controlled so that the porous organic-inorganic composite layer finally formed after drying has a thickness of 0.1 to 20 µm, in consideration of the safety improvement of the battery and the resistance of the separator.

The coating of the first solvent according to the step S2 and the coating of the slurry according to the step S3 may be carried out by various techniques such as slot die coating, slide coating, curtain coating, or the like in a sequential or non-sequential way. In particular, the coating processes in the steps S2 and S3 are preferably carried out sequentially or simultaneously in aspect of productivity. A preferred embodiment of the sequential coating is illustrated in FIG. 1.

Referring to FIG. 1, a die 1 having two slots 3a and 3b is used to carry out the coating of the first solvent according to the step S2 the coating of the slurry according to the step S3. The first solvent 7 is supplied through the first slot 3a. In addition, the inorganic particles are dispersed through the second slot 3b, and the slurry 5 is supplied to the second solvent in which the binder polymer is dissolved. If the porous substrate 9 is supplied onto a rotating roller, the porous substrate 9 is coated with the first solvent 7, and sequentially the first solvent 7 is coated with the slurry 5.

Finally, the first solvent applied onto the porous substrate and the second solvent present in the slurry are dried simultaneously so that a porous organic-inorganic composite layer is formed on the porous substrate (S4).

The porous organic-inorganic composite layer formed according to the method of the present invention will be described below.

The resultant product of the step S3 is configured so that the porous substrate is coated with the first solvent thereon, which is also coated with the slurry thereon. If the resultant product passes through a drier or the like, the slurry applied onto the first solvent firstly receives heat or hot wind. Therefore, the second solvent in the slurry applied to an outer region is dried earlier than the first solvent. Accordingly, before the binder polymer in the slurry is entirely diffused to the layer composed of the first solvent, a coating layer of the binder polymer is formed on the surface of the inorganic particles in whole or in part, from the inorganic particles present in the outermost region of the slurry coating layer. At this time, the inorganic particles are present substantially in a closely adhered state, and as the inorganic particles fixedly connect to each other by the coating layer of the binder polymer, vacant spaces are formed among the inorganic particles to form pores. Therefore, the dispersion of the binder polymer in the slurry into the pores of the porous substrate due to the first solvent layer is minimized. Accordingly, the phenomenon that the pores of the porous substrate are closing by the binder polymer in the slurry is minimized, and so it is possible to prevent the resistance of the separator from increasing due to the formation of the porous organic-inorganic composite layer.

The separator may be interposed between a cathode and an anode, followed by winding or lamination to manufacture an electrochemical device. An electrochemical device manufactured by the method may be any device in which electrochemical reactions occur, and specific examples thereof include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

There is no particular restriction on the production method of a cathode and an anode to be applied together with the separator of the present invention. Each of the electrodes can be produced by binding an electrode active material to an electrode current collector by suitable methods known in the art. The cathode active material may be any of those that are commonly used in cathodes of conventional electrochemical devices. Non-limiting examples of particularly preferred cathode active materials include lithium manganese oxides, lithium cobalt oxides, lithium nickel oxides, lithium iron oxides and lithium composite oxides thereof. The anode active material may be any of those that are commonly used in anodes of conventional electrochemical devices. Non-limiting examples of particularly preferred anode active materials include lithium, lithium alloys, and lithium intercalation materials such as carbon, petroleum coke, activated carbon, graphite and other carbonaceous materials. Non-limiting examples of cathode current collectors suitable for use in the electrochemical device of the present invention include aluminum foils, nickel foils and combinations thereof. Non-limiting examples of anode current collectors suitable for use in the electrochemical device of the present invention include copper foils, gold foils, nickel foils, copper alloy foils and combinations thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ or a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during manufacturing of the electrochemical device depending on the manufacturing processes and desired physical properties of a final product. Specifically, the electrolyte may be injected before battery assembly or in the final step of battery assembly.

MODE FOR INVENTION

Hereinafter, the present invention will be explained in detail with reference to embodiments. The embodiments of the present invention, however, may take several other forms, and the scope of the invention should not be construed as being limited to the following examples. The embodiments of the present invention are provided to more fully explain the present invention to those having ordinary knowledge in the art to which the present invention pertains.

Example 1

Polyvinylidene fluoride-co-chlorotrifluoroethylene copolymer (PVdF-CTFE) and cyanoethylpullulan were added to acetone in a weight ratio of 10:2 and dissolved therein at 50° C. for at least about 12 hours to prepare a polymer solution.

Inorganic particles in which Al$_2$O$_3$ powder and BaTiO$_3$ powder were mixed in a weight ratio of 9:1 were added to the prepared polymer solution until the weight ratio of the binder polymer to the inorganic particles reached 10:90. The inorganic particles were crushed and dispersed using a ball mill for at least 12 hours to prepare a slurry. The inorganic particles of the slurry had an average particle diameter of 600 nm.

The prepared slurry and a separately prepared acetone were sequentially supplied through the slot die illustrated in FIG. 1 to coat one surface of a 12 nm thick porous polyethylene membrane (porosity 45%). The coating thickness of the acetone was 20 μm, and the coating amount of the slurry was set to be 60 μm so that a finally formed porous organic-inorganic composite layer has a thickness of 4 μm.

Subsequently, the coated substrate was passed through a dryer adjusted to have a temperature of 50° C. to dry the solvents, completing the manufacture of a separator.

The separator was found to have a Gurley value of 190 sec/100 mL in a good level. In addition, the separator had a resistance of 0.652 in a good level.

Comparative Example 1

A separator was manufactured in the same manner as in Example 1, except that acetone was not applied and only the slurry was applied through the slot die shown in FIG. 1. The coating amount of the slurry was adjusted so that a finally formed porous organic-inorganic composite layer had a thickness of 4 μm.

The Gurley value of the separator was 230 sec/100 mL, and the resistance of the separator increased to 1.0Ω.

Comparative Example 2

A separator was manufactured in the same manner as in Comparative Example 1, except that both surfaces of the polyethylene porous membrane were coated with the slurry in a dip coating manner, instead of the slot die coating. The coating amount of the slurry applied to both surfaces was adjusted so that finally formed porous organic-inorganic composite layers respectively had a thickness of 2 μm (the sum of thicknesses of both surfaces was 4 μm).

The Gurley value of the separator was 290 sec/100 mL, and the resistance of the separator increased to 1.4Ω.

The separators manufactured according to the Example and Comparative Examples above were respectively interposed between a cathode and an anode and wound to assemble an electrode structure. The anode was prepared by forming an anode active material layer containing anode active material particles made of graphite on a copper foil, and the cathode was prepared by forming a cathode active material layer containing lithium cobalt oxide on an aluminum foil. A non-aqueous electrolyte prepared by dissolving 1 mol of lithium hexafluorophosphate in an organic solvent in which ethylene carbonate and ethyl methyl carbonate were mixed in a volume ratio of 1:2 was injected into the assembled electrode structure to manufacture a lithium secondary battery.

C-rate of each lithium secondary battery prepared as above was measured. The measurement results are shown in Table 1 below.

TABLE 1

| | Discharge rate condition | Battery of Example 1 | Battery of Comparative Example 1 | Battery of Comparative Example 2 |
|---|---|---|---|---|
| Ratio of capacity to design capacity | 0.2 C | 99.6% | 99.4% | 99.2% |
| | 1.0 C | 99.8% | 95.8% | 95.5% |
| | 2.0 C | 93.9% | 91.4% | 90.7% |

As shown in Table 1, there was no great difference at the low rate discharge, but the discharge capacity of a battery adopting the separator of Example with a low resistance was high under a high rate discharge condition in comparison to batteries adopting the separators of the comparative examples.

What is claimed is:

1. A method for manufacturing a battery separator, comprising:
   (S1) coating at least one surface of a porous substrate with only a first solvent selected from acetone, tetrahydrofuran, methylene chloride, chloroform or mixtures thereof;
   (S2) coating the first solvent with a slurry containing inorganic particles dispersed therein and formed by dissolving a binder polymer in a second solvent; and
   (S3) removing the first and second solvents wherein the removing consists of drying by heat to form a porous organic-inorganic composite layer on the porous substrate, wherein the second solvent in the slurry is dried earlier than the first solvent to form a coating layer of the binder polymer on surfaces of the inorganic particles in whole or in part before the binder polymer in the slurry is entirely diffused to the first solvent;
   wherein the second solvent is selected from the group acetone, tetrahydrofuran, methylene chloride, chloroform, or their mixtures,
   wherein the first solvent has a boiling point equal to or higher than that of the second solvent,
   wherein the porous substrate is a polyolefin-based porous film,
   wherein the first solvent has a coating thickness of 10 to 250 μm,
   wherein the binder polymer is selected from polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, or their mixtures,
   wherein the coating of the first solvent according to step (S1) and the coating of the slurry according to step (S2) is carried out using a die having two slots in a sequential way.

2. The method for manufacturing a battery separator according to claim 1,
   wherein the inorganic particles fixedly connect to each other by the coating layer in an adhered state, and
   wherein vacant spaces present among the inorganic particles form pores.

3. The method for manufacturing a battery separator according to claim 1, wherein the porous substrate has a thickness of 1 to 100 μm.

4. The method for manufacturing a battery separator according to claim 1, wherein the binder polymer has a solubility parameter of 15 to 45 $MPa^{1/2}$.

5. The method for manufacturing a battery separator according to claim 1, wherein the first and second solvents are the same kind of solvent.

6. The method for manufacturing a battery separator according to claim 1, wherein the difference in solubility parameters between the binder polymer and the first solvent, between the binder polymer and the second solvent, and between the first solvent and the second solvent is 5.0 $Mpa^{0.5}$ or less, respectively.

7. The method for manufacturing a battery separator according to claim 1, wherein the average particle diameter of the inorganic particles is 0.001 to 10 μm.

8. The method for manufacturing a battery separator according to claim 1, wherein the weight ratio of the inorganic particles to the binder polymer is 50:50 to 99:1.

9. The method for manufacturing a battery separator according to claim 1, wherein the first solvent has a boiling point higher than that of the second solvent.

* * * * *